United States Patent [19]

Lesk

[11] 3,900,345

[45] Aug. 19, 1975

[54] THIN LOW TEMPERATURE EPI REGIONS BY CONVERSION OF AN AMORPHOUS LAYER

[75] Inventor: Israel A. Lesk, Scottsdale, Ariz.

[73] Assignee: Motorola, Inc., Chicago, Ill.

[22] Filed: Aug. 2, 1973

[21] Appl. No.: 385,195

[52] U.S. Cl. ................. 148/1.5; 148/174; 148/175; 148/176

[51] Int. Cl.[2] ........................................... H01L 7/00

[58] Field of Search ............ 148/174, 175, 176, 1.5; 117/227

[56] References Cited

UNITED STATES PATENTS

| | | | |
|---|---|---|---|
| 3,208,888 | 9/1965 | Ziegler et al. | 148/175 |
| 3,370,980 | 2/1968 | Anderson | 117/227 |
| 3,519,901 | 7/1970 | Bean et al. | 148/174 |
| 3,589,949 | 6/1971 | Nelson | 148/1.5 |
| 3,775,196 | 11/1973 | Wakamiya et al. | 148/175 |

OTHER PUBLICATIONS

Ziegler, J., Improving Electrical Characteristics of Ion Implantation, in IBM Tech. Discl. Bull., 12, 1970, p. 1576.

I.B.M. Tech. Discl. Bull. (Sadagupan et al.) 15, July 1972, pp. 439–440.

*Primary Examiner*—Walter R. Satterfield
*Attorney, Agent, or Firm*—Vincent J. Rauner; Willis E. Higgins

[57] ABSTRACT

A method is described for growing thin monocrystalline silicon material upon a supporting substrate. Polycrystalline amorphous material is first deposited on the supporting substrate; then the interface region between the polycrystalline material and the supporting substrate is damaged by ion implantation of compatible ions for establishing an intimate contact between the polycrystalline material and the substrate material at the interface. A low temperature aneal cycle is next performed whereby the polycrystalline material is changed to monocrystalline.

3 Claims, No Drawings

THIN LOW TEMPERATURE EPI REGIONS BY CONVERSION OF AN AMORPHOUS LAYER

BACKGROUND OF THE INVENTION

The present invention relates to the formation of a thin layer of monocrystalline material on a supporting substrate.

It is well known that monocrystalline material having a surface layer damaged by ion implantation can be annealed for removing the damage and restoring the monocrystalline nature of the material to its original state. However, in those instances where polycrystalline amorphous material is deposited on a supporting substrate and then the polycrystalline material is annealed in an attempt to change its polycrystalline nature to monocrystalline, the material does not change into the monocrystalline state. The reason for the material not changing into monocrystalline is lack of intimate contact between the supporting substrate of monocrystalline material and the very thin layer of polycrystalline amorphous material. In most instances, a very thin layer of oxide is formed on the supporting substrate and exists between it and the polycrystalline amorphous layer. In this manner, the monocrystalline nature of the supporting structure has little or no influence during annealing on the thin polycrystalline amorphous layer formed thereon.

The present invention is directed towards the formation of a thin layer of polycrystalline amorphous material atop a supporting substrate, causing intimate contact of the polycrystalline amorphous member with the supporting substrate at the interface between the two members, annealing the combined structure for changing the polycrystalline amorphous material into monocrystalline material.

SUMMARY OF THE INVENTION

It is an object of the present invention to provide a thin layer of monocrystalline material atop a supporting substrate.

It is another object of the present invention to provide a monocrystalline layer of material having a thickness of one micron or less atop a supporting substrate.

It is a still further object of the present invention to provide a method for forming a thin layer of monocrystalline material atop a supporting substrate by depositing a thin layer of polycrystalline amorphous material on the supporting substrate, damaging the interface between the substrate and the polycrystalline layer to form intimate contact between the materials making up each layer, and then annealing the combination of materials such that intimate contact between the substrate and the polycrystalline amorphous material promotes monocrystalline growth during the anneal cycle.

DETAILED DESCRIPTION OF THE INVENTION

In the manufacture of semiconductor devices, it is necessary and desirable to build certain semiconductor devices in ultra thin layers of surface material. The use of an ultra thin layer of material increases the operating frequency of the structures by permitting use of designs which reduce the parasitic capacitance of the structure. However, problems have been encountered in the formation of such ultra thin surface layers because of the inconsistent method in which such surface layers can be formed atop a supporting substrate. For example, the supporting substrate normally contains doping impurities. One problem has been the formation of a thin surface layer free from impurity which migrates from the supporting substrate to the thin surface layer. At the temperatures normally used in the formation of epitaxial surface layers, impurities from the substrate migrate into the epitaxial layer being formed atop the supporting substrate. These temperatures are normally in the 1000°C to 1200°C range and outdiffusion from the supporting substrate is common.

Polycrystalline amorphous material is deposited at significantly lower temperatures than the formation of an epitaxial layer. However, it has been found that attempts to change the polycrystalline amorphous material to monocrystalline material have failed. My investigation into the reason for such failures indicates that the reason is the lack of intimate contact between the supporting substrate and the polycrystalline layer. Often times, a very thin oxide layer is formed atop the supporting substrate prior to the formation of the polycrystalline amorphous layer atop the supporting substrate. I propose that the use of ion implantation to damage the interface between the polycrystalline amorphous layer formed atop the supporting substrate and the supporting substrate be used to promote the conversion of the polycrystalline material to monocrystalline material during an anneal cycle of the structure.

EXAMPLE 1

An N plus substrate is positioned in a reactor and a polycrystalline amorphous silicon layer approximately one micron thick is formed atop the supporting substrate. This polycrystalline silicon layer is essentially undoped at the time of its formation. The resulting combination of supporting substrate and thin polycrystalline amorphous material layer is removed from the reactor and brought to a location wherein an ion implantation machine is available for implanting silicon atoms through the thin polycrystalline layer and into the supporting substrate. The density of radiation would be in the range of $10^{15}$ atoms/cm$^2$. This radiation is uniformly applied over the surface of the structure and provides intimate mixing of the materials at the interface between the supporting substrate and the polycrystalline amorphous layer. Next, the wafer is brought to an annealing furnace where an anneal cycle for about 1 hour at a temperature range between 600°C to 900°C changes the polycrystalline amorphous material into monocrystalline form. The resulting layer is now suitable for the formation of semiconductor devices.

EXAMPLE 2

An N plus silicon wafer is positioned in a reactor and a thin layer of polycrystalline amorphous material is formed thereon. The temperature range of the reactor lies in the range of 500°C to 600°C wherein the composition of silane and a carrier gas such as hydrogen or nitrogen causes a formation of a thin amorphous silicon layer atop the silicon substrate. During the formation of the polycrystalline layer, impurities are introduced into the reactor for the formation of a uniformed doped polycrystalline amorphous silicon layer atop the substrate. At the completion of the step for forming the polycrystalline amorphous layer, the wafers are removed and brought to the ion implantation station where protons are implanted through the polycrystalline layer into the supporting substrate for damaging the interface between the substrate and the polycrystalline amorphous layer. Ion implantation is done over the entire surface area of the wafer to insure intimate contact between the silicon substrate and the polycrystalline amorphous layer. Next the wafers are brought to an annealing station wherein the wafers are heated to a temperature lying within the range of 600°C to 900°C annealed for a time of approximately 15 minutes to 120 minutes.

EXAMPLE 3

An N plus silicon wafer is placed in a reactor for the formation of low temperature polycrystalline material thereon. Using a combination of silane and hydrogen gases, the amorphous silicon layer is deposited uniformly over the wafer to a depth of a micron or less. This polycrystalline material can be doped or undoped. Such polycrystalline material is to be deposited at a temperature of 500°C in an atmosphere containing silane and hydrogen. The wafers are then removed to an ion implantation station where inert gas ions such as H plus or Si plus are implanted through the polycrystalline amorphus material into the supporting substrate. This implantation of inert gas ions damages the interface between the substrate and the polycrystalline amorphous layer and promotes intimate contact there between. After the entire surface areas of the wafers have been irradiated, the wafers are removed to an annealing station wherein the wafers are raised to a temperature of 700°C for a time period approximately 60 minutes whereby the polycrystalline material changes to monocrystalline.

Thicker layers than one micron can be formed by recycling the wafers through the above identified processes after the formation, damaged and conversion steps for each layer of polycrystalline material. After the conversion of the first layer of polycrystalline material to moncrystalline material, the wafers are recycled through the process whereby a polycrystalline amorphous layer is formed, the interface between the polycrystalline amorphous layer and the monocrystalline layer just previously formed is damaged by the implantation of ions and the resulting wafer is annealed for changing the polycrystalline amorphous material to monocrystalline.

The temperature ranges presently known in the art for annealing ion implanted damaged monocrystalline material back to a nondamaged condition are the same temperatures that are useful here for changing the polycrystalline amorphous material into monocrystalline form.

Although the invention has been described in terms of certain specific embodiments, it will be understood that other arrangements may be devised by those skilled in the art which likewise follow in the scope and spirit of this invention.

What is claimed is:

1. A method for forming a thin layer of monocrystalline silicon atop a supporting monocrystalline silicon substrate comprising the steps of:

providing a monocrystalline silicon substrate, said substrate having a thin oxide layer on its upper surface;

depositing a polycrystalline silicon amorphous layer atop the thin oxide layer on said monocrystalline silicon substrate at a temperature lying within the range of 500°C to 600°C, thereby forming an interface including the thin oxide layer between said monocrystalline substrate and said polycrystalline silicon layer;

implanting ions through said polycrystalline silicon layer into said substrate to a sufficient extent to damage the interface including the thin oxide layer between said substrate and said polycrystalline silicon layer, thereby establishing intimate contact between said substrate and polycrystalline silicon layer; and raising the temperature of said substrate and polycrystalline silicon layer to a range of 600°C to 900°C for converting said polycrystalline silicon amorphous layer to a monocrystalline silicon layer.

2. The method of forming a thin layer of monocrystalline material atop a supporting substrate as recited in claim 1 wherein the ions implanted into the supporting substrate are selected from the group of ions comprising; silicon, protons, He plus and N plus.

3. The process of claim 1 in which said polycrystalline silicon amorphous layer is deposited from a silane and a carrier gas at a temperature lying within the range of 500°C to 600°C.

* * * * *